United States Patent
St. Aubin et al.

(10) Patent No.: US 6,180,240 B1
(45) Date of Patent: Jan. 30, 2001

(54) ACRYLIC OGLIGOMERIC AND POLYMERIC DURABILITY ENHANCING AGENTS, METHOD THEREFORE AND CURED COATING COMPOSITION CONTAINING THE SAME

(75) Inventors: Donald L. St. Aubin, Commerce Township; John E. Boisseau, Bloomfield Hills, both of MI (US); John W. Rehfuss, Huntersville, NC (US); Patricia K. Oberg, Birmingham, MI (US)

(73) Assignee: BASF Corporation, Southfield, MI (US)

( * ) Notice: Under 35 U.S.C. 154(b), the term of this patent shall be extended for 0 days.

(21) Appl. No.: 09/271,784

(22) Filed: Mar. 18, 1999

Related U.S. Application Data

(62) Division of application No. 08/769,289, filed on Dec. 18, 1996.

(51) Int. Cl.⁷ ..................... B32B 27/38
(52) U.S. Cl. ..................... 428/412
(58) Field of Search ............... 525/326.7, 327.1, 525/328.2, 330.3, 330.5; 526/255, 263, 265, 301, 313, 318, 329.7; 544/216; 560/158, 25, 26; 546/224, 231, 229; 548/259, 260; 528/369; 428/412

(56) References Cited

U.S. PATENT DOCUMENTS 4,504,628 * 3/1985 Johnson .................... 525/278
5,474,811 * 12/1995 Rehfuss et al. ............ 427/407.1

* cited by examiner

*Primary Examiner*—Veronica P. Hoke
(74) *Attorney, Agent, or Firm*—Anne Gerry Sabourin

(57) ABSTRACT

A durability enhancing agent comprising the reaction product of an acrylic oligomer or acrylic polymer and an ultraviolet light absorbing compound, a hindered amine light stabilizer or mixture thereof, said durability enhancing agent further comprising more than one carbamate functional group, or group convertible to a carbamate group, and optionally, including other reactive functionality capable of undergoing a crosslinking reaction. Also included is a curable coating composition comprising the durability enhancing agent, a method for obtaining a coated substrate and the coated article obtained thereby.

4 Claims, No Drawings

ACRYLIC OGLIGOMERIC AND POLYMERIC DURABILITY ENHANCING AGENTS, METHOD THEREFORE AND CURED COATING COMPOSITION CONTAINING THE SAME

This is a divisional of copending application Ser. No. 08/769,289, filed on Dec. 18, 1996.

BACKGROUND OF THE INVENTION

1. Field of the Invention

The present invention relates to acrylic ultraviolet light absorber and hindered amine light stabilizer compounds, method therefore and coating compositions containing the same, wherein the compounds include a carbamate functionality.

2. Discussion of the Prior Art

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI).

In the field of automotive coatings, it has become an objective to obtain a clearcoat (i.e., the outermost automotive coating) that is resistant to being etched by environmental fallout. Environmental etching is manifested by pitting, water spotting or chemical spotting of the coating or any combination of these. Environmental etch resistance is desirable because it improves the appearance and useful life of the coating.

Environmental etch resistance can be measured by visual examination of the coating, or by a profilometer or by subjecting a coating on a test panel to a saline solution in a temperature gradient oven test. Environmental etch resistance is generally measured by visual examination by individuals skilled at examining finishes for the degree of environmental etch therein. Environmental etch resistance has become more important as the amount of acid rain, and other industrial fallout has increased. Currently, environmental etching of automotive finishes is generally greatest in the areas most greatly affected by industrial fallout.

The incorporation of the HALS or UVAs as free additions or as polymer or oligomer bound UVA or HALS into a coating composition generally improves resistance of the coating composition to degradation caused by ultraviolet light exposure. Binding the HALS or UVA to an oligomer or polymer stabilizes the HALS or UVA in a coating composition, prevents migration of the UVA or HALS into other coating layers and retains the UVA or HALS in the clearcoat, where it is needed.

A coating composition containing a carbamate functional resin has shown to be effective against environmental etch even without the addition of HALS and UVAs. The addition of free HALS and UvAs, (i.e. not polymer- or oligomer-bound), has effected little or no improvement in environmental etch resistance in the coatings containing carbamate functional resins. Unexpectedly, it has been shown that addition of the polymer- or oligomer-bound HALS or UVA to a carbamate containing coating provides improved environmental etch resistance of the cured film.

SUMMARY OF THE INVENTION

According to the present invention, durability enhancing agents comprising oligomer-bound and polymer-bound ultraviolet light absorber (UVA) or hindered amine light stabilizer (HALS) compounds comprise a UVA and/or HALS bonded to an oligomeric or polymeric component, and the agents include more than one carbamate functional group, or group convertible to a carbamate functional group. The oligomer or polymer may comprise more than one UVA or HALS bound thereto, or a mixture of UVA(s) and HALS bound thereto. The oligomer-bound or polymer-bound UVA or HALS may also include additional reactive functionality that is crosslinkable into a cured coating film.

The oligomer- or polymer-bound HALS or UVA may comprise the principal resin or a separate component of the coating composition. The invention is also directed to the cured coating composition, and a method for incorporating ultraviolet light absorbing compounds and hindered amine light stabilizers into a cured coating composition comprising reacting the ultraviolet light absorbing and/or hindered amine light stabilizing compound into a crosslinked matrix which is formed upon curing the coating composition.

Generally, the incorporation of the polymer- or oligomer-bound UVA or HALS into a coating composition stabilizes the HALS or UVA in a coating composition, prevents migration of the UVA or HALS into other coating layers and retains the UVA or HALS in the where it is needed. The polymer- or oligomer-bound HALS or UVA according to the present invention, including carbamate functionality, provides the unexpected result of improved environmental etch resistance of the cured film.

DETAILED DESCRIPTION OF THE INVENTION

The present invention is a durability enhancing agent which is an acrylic oligomer-bound or acrylic polymer-bound ultraviolet light absorber or hindered amine light stabilizer, comprising a UVA or HALS, or mixture of UVA and HALS, bonded to an acrylic oligomer or polymer, wherein the agent includes more than one carbamate functional group, or group convertible to a carbamate functional group and may include other reactive functionality that is crosslinkable into a coating film. The oligomer- or polymer-bound HALS or UVA may comprise the principal resin or a separate component of a coating composition.

The ultraviolet light absorber or hindered amine light stabilizer compounds are reacted onto the oligomer or polymer by addition or grafting reactions. The UVA or HALS may be copolymerized with monomers used to form the oligomer or polymer.

Examples of ultraviolet light absorbers useful in the present invention include benzotriazoles, 2-hydroxybenzophenones, oxanilide, and 2-hydroxyphenyltriazines. In a preferred embodiment, the ultraviolet absorber is a polymer-bound benzotriazole.

One example of benzotriazole useful in the present invention is shown in formula (Ia):

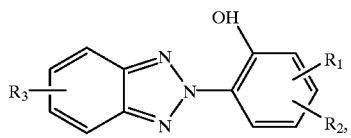

(Ia)

wherein, in the compounds of the formula (Ia), $R_1$, $R_2$ and $R_3$ can be hydrogen, but at least one of the radicals $R_1$ and $R_2$ must be other than hydrogen. Additionally, $R_1$, $R_2$ and $R_3$ can be halogen, hydroxyl halogen methyl, alkyl having 1 to 18 carbons, phenyl alkyl having 1 to 4 carbons in the alkyl moiety, hydroxy alkyl having 1 to 24 carbon atoms in the alkyl chain, such as methyl, ethyl, propyl, butyl, hexyl, octyl, nonyl, dodecyl, tetradecyl, hexadecyl, octadecyl, nonadecyl and eicosyl and also corresponding branched isomers, alkyl substituted by —COOH, —COO$Y_8$, —CON$H_2$, —CONH$Y_9$, —CON$Y_9Y_{10}$, —N$H_2$, —NH$Y_9$, —N$Y_9Y_{10}$, —NHCO$Y_{11}$, —CN, and/or —OCO$Y_{11}$, which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCO$Y_{11}$, phenylalkyl which has 1 to 5 carbon atoms in the alkyl moiety and is unsubstituted or substituted by hydroxyl, chlorine and/or methyl, —CO$Y_{12}$ or —$SO_2Y_{13}$, or, if u is 2, $Y_2$ is alkylene having 2 to 16 carbon atoms, alkylene having 4 to 12 carbon atoms, xylene, alkylene which has 3 to 20 carbon atoms, is interrupted by one or more —O— atoms and/or substituted by hydroxyl, —$CH_2CH(OH)CH_2$—O—$Y_{15}$, —OCH$_2$CH(OH)CH$_2$—, CO—$Y_{16}$—CO—, —CO—NH—$Y_{17}$—NH—CO—, or —(CH$_2$)$_m$—CO$_2$—$Y_{18}$—OCO—(CH$_2$)$_m$, in which m is 1,2 or 3, $Y_8$ is amine, alkylamine or cycloalkylamine wherein the alkyl or cyclosalkyl group is between 1 and 6 carbon atoms and may be substituted or unsubstituted, alkyl having 1 to 18 carbon atoms, alkenyl having 3 to 18 carbon atoms, alkyl which has 3 to 20 carbon atoms, is interrupted by one or more oxygen or sulfur atoms or -N$T_6$— and/or is substituted by hydroxyl, alkyl which has 1 to 4 carbon atoms and is substituted by —P(O) (O$Y_{14}$)$_2$, —N$Y_9Y_{10}$ or —OCO$Y_{11}$ and/or hydroxyl, alkenyl having 3 to 18 carbon atoms, glycidyl, or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or $Y_9$ and $Y_{10}$ together are alkylene, oxalkylene or azaalkylene having in each case 3 to 9 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkyphenyl having 1 to 8 carbon atoms in the alkyl radical, $Y_{14}$ is alkyl having 1 to 12 carbon atoms or phenyl, $Y_{15}$ is alkylene having 2 to 10 carbon atoms, pheneylene or a group -phenylene-M-phenylene-in which M is —O—, —S—, —$SO_2$—, —$CH_2$—or —C(CH$_3$)$_2$—, $Y_{16}$ is alkylene, oxyalkylene or thiaalkylene having in each case 2 to 10 carbon atoms, phenylene or alkenylene having 2 to 6 carbon atoms, $Y_{17}$ is alkylene having 2 to 10 carbon atoms, phenylene or alkylphenlene having 1 to 11 carbon atoms in the alkyl moiety, and $Y_{18}$ is alkylene having 2 to 10 carbon atoms or alkylene which has 4 to 20 carbon atoms and is interrupted once or several times by oxygen.

$R_1$ may be phenylalkyl having 1 to 4 carbon atoms in the alkyl moiety, for example benzyl, and can also be cycloalkyl having 5 to 8 carbon atoms, for example cyclopentyl, cyclohexyl and cyclooctyl, or a radical of the formula

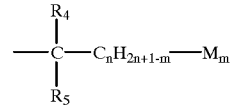

in which $R_4$ and $R_5$ independently of one another are alkyl having in each case 1 to 5 carbon atoms, in particular methyl, or $R_4$ together with the radical $C_nH_{2n+1-m}$, forms a cyclolakyl radical having 5 to 12 carbon atoms, for example cyclohexyl, cyclooctyl and cyclodecyl. M is a radical of the formula —COO$R_6$ in which R, is hydrogen, or alkyl having 1 to 12 carbon atoms, or alkoxyalkyl having 1 to 20 carbon atoms in each of the alkyl and the alkoxy moieties. Suitable alkyl radicals $R_6$ are those enumerated for $R_1$. Examples of suitable alkoxyalkyl groups are —$C_2H_4OC_2H_5$, —$C_2H_4OC_8H_{17}$ and —$C_4H_8OC_4H_9$. As phenylalkyl having 1 to 4 carbon atoms, $R_6$ is, for example, benzyl, cumyl, α-methylbenzyl or phenylbutyl.

At least one of the radicals $R_1$ and $R_2$ must be other than hydrogen.

Alternatively, the benzotriazole has the following formula:

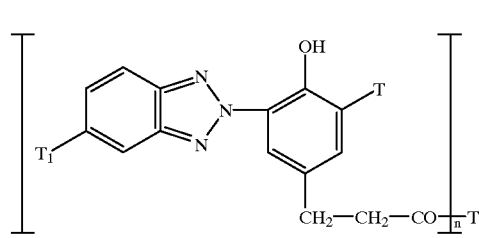

I(b)

In the compounds of the formula (Ib) T is hydrogen or alkyl having 1 to 6 carbon atoms, such as methyl and butyl, $T_1$ is hydrogen, chlorine or alkyl or alkoxy having in each case 1 to 4 carbon atoms, for example methyl, methoxy and butoxy, and n is 1 or 2. If n is 1, $T_2$ is chlorine or a radical of the formula -O$T_3$ or

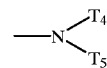

and if
n is 2, $T_2$ is a radical of the formula

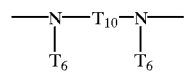

or—O-$T_9$—O—, where $T_3$ is hydrogen, alkyl which has 1 to 18 carbon atoms and is unsubstituted or substituted by 1 to 3 hydroxyl groups or by —OCO$T_6$, alkyl which has 3 to 18 carbon atoms, is interrupted once or several times by —O—or-N$T_6$- and is unsubstituted or substituted by hydroxyl or -OCO$T_6$ Examples of $T_3$ as cycloalkyl include cycloalkyl having 5 to 12 carbon atoms, such as cyclopentyl, cyclohexyl or cyclooctyl and is unsubstituted or substituted by hydroxyl and/or alkyl having 1 to 4 carbon atoms in the alkyl moiety, for example benzyl or phenylbutyl. $T_3$ can also be alkenyl having 2 to 18 carbon atoms. Suitable alkenyl radicals are derived from the alkyl radicals enumerated in the definitions of $R_1$. These alkenyl radicals can be substituted by hydroxyl. Examples of $T_3$ as phenylalkyl are benzyl, phenylethyl, cumyl, a-methylbenzyl or benzyl. $T_3$ can also be a radical of the formula $—CH_2C—H(OH)$-$T_7$ or

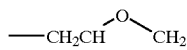

$T_4$ and $T_5$ independently of one another are hydrogen, alkyl having 1 to 18 carbon atoms, alkyl which has 3 to 18 carbon atoms and is interrupted once or several times by —O—or $NT_6$-, cycloalkyl having 5 to 12 carbon atoms, for example. phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, $T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, $T_7$ is hydrogen, alkyl having 1 to 18 carbon atoms, phenyl which is unsubstituted or substituted by hydroxyl, phenylakyl having 1 to 4 carbon atoms in the alkyl moiety, or —$CH_2OT_8$, $T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl.

Alternatively, the polymer-bound ultraviolet light absorber may comprise triazines such as 2-hydroxyphenyl triazines having the formula (IIa)

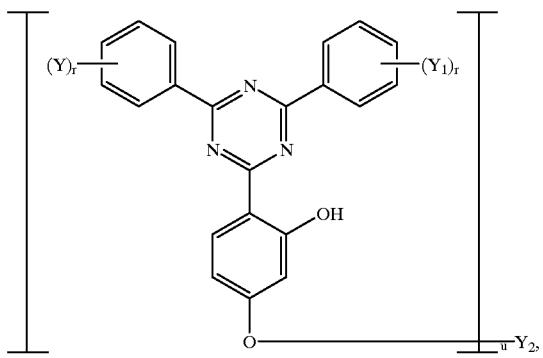

in the formula (IIa)
u is 1 to 2,
r is an integer from 1 to 3,
the substituents $Y_1$ independently of one another are hydrogen, hydroxyl, halogen, halogenomethyl, alkyl having 1 to 12 carbon atoms, alkoxy having 1 to 18 carbon atoms, when u is 1, $Y_2$ is alkyl having 1 to 18 carbon atoms, alkyl which has 1 to 12 carbon atoms and is substituted by —COOH, —$COOY_8$, —$CONH_2$, $CONHY_9$, —$ONY_9Y_{10}$, —CN, —$OCOY_{11}$, or mixtures thereof; alkyl which has 4 to 20 carbon atoms which is interrupted by one or more oxygen atoms and is unsubstituted or substituted by hydroxyl or alkoxy having 1 to 12 carbon atoms; alkenyl having 3 to 6 carbon atoms, glycidyl, phenylalkyl which has 1 to 5 carbon atoms in the alkyl moiety and is unsubstituted or substituted by hydroxyl, chlorine and or methyl; —$COY_{12}$ or $SO_2Y_{13}$ wherein $Y_8$ is amino, alkylamine or cycloalkylamine, wherein the alkyl or cyloalkyl group has up to 6 carbon atoms, alkyl having 1 to 18 carbon atoms, alkenyl having 3 to 18 carbon atoms, alkyl which has 3 to 20 carbon atoms, and is interrupted by one or more oxygen atoms, or said alkyl substituted by substituted by hydroxyl; alkenyl having 3 to 18 carbon atoms, glycidyl or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical; and when u is 2, $Y_2$ is alkylene having 2 to 16 carbon atoms, alkylene having 4 to 12 carbon atoms and is interrupted by one or more —O— atoms and/or is substituted by hydroxyl; —$CH_2CH(OH)CH_2$—O—$Y_{15}$—$OCH_2CH(OH)CH_2$, or —$(CH_2)_m$—$CO_2$—$Y_{18}$—OCO—$(CH_2)_m$, in which m is 1,2 or 3, $Y_{15}$ is alkylene having 2 to 10 carbon atoms, phenylene or a group -phenylene-M-phenylene- in which M is —O—, —S—, —$SO_2$—, —$CH_2$— or —$C(CH_3)_2$—, and $Y_{18}$ is alkylene having 2 to 10 carbon atoms or alkylene which has 4 to 20 carbon atoms and is interrupted once or several times by oxygen.

Examples of hindered amine light stabilizers useful in the present invention include derivatives of 2,2,6,6-tetramethylpiperidine. These stabilizers protect polymers by functioning as light-stable antioxidants. The hindered amine light stabilizers contain a reactive functionality thereon for reaction with the polymer or oligomer. The reactive functionality may comprise a group such as hydroxyl, carboxyl, amine, or ethylenically unsaturated group. The ultraviolet light absorber or hindered amine light stabilizer compounds are reacted onto the oligomer or polymer by addition or grafting reactions with the reactive functionality on the HALS or UVA. Example of such HALS are set forth in U.S. Pat. Nos. 5,216,156 to Galbo, 5,004,770 and 5,124,378 to Behrens et al.

One such example of a suitable HALS for purposes of the present invention is an —O—substituted N-hydroxyl hindered amine light stabilizer having the formula:

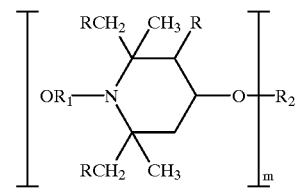

wherein R is hydrogen or methyl, $R_1$ is independently $C_1$–$C_{18}$ alkyl, $C_2$–$C_{18}$ alkenyl, $C_2$–$C_{18}$ alkynyl, $C_5$–$C_{12}$ cycloalkyl, $C_6$–$C_{10}$ bicycloalkyl, $C_5$–$C_8$ cycloalkenyl, $C_6$–$C_{10}$ aryl, $C_7$–$C_9$ aralkyl, $C_7$ aralkyl substituted by alkyl or aryl, or

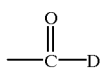

wherein D is $C_1$–$C_{18}$ alkyl, $C_1$–$C_{18}$ alkoxy, phenyl, phenyl substituted by hydroxy, alkyl or alkoxy, or amino or amino mono- or di-substituted by alkyl or phenyl;

m is 1–4, when m is 1, $R_2$ is hydrogen, $C_1$–$C_{18}$, alkyl optionally interrupted by one or more oxygen atoms, $C_2$–$C_{12}$ alkenyl, $C_6$–$C_{10}$ aryl, $C_7$–$C_{18}$ aralkyl, glycidyl, a monovalent acyl radical of an aliphatic cycloaliphatic, araliphatic or aromatic carboxylic acid, or of a carbamic acid

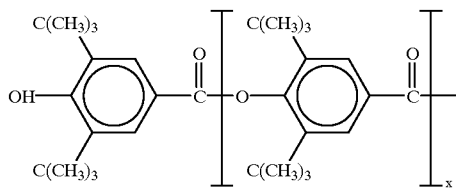

wherein x is 0 or 1, or

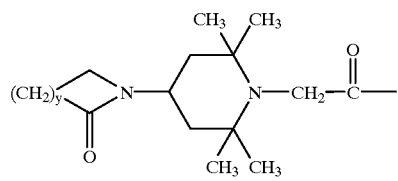

wherein y is 2–4; when m is 2, $R_2$ is $C_1$–$C_{12}$ alkylene, $C_4$–$C_{12}$ alkenylene, xylylene, a divalent acyl radical of an aliphatic, cycloaliphatic, araliphatic or aromatic dicarboxylic acid or of a dicarbamic acid, when m is 3, $R_2$ is a trivalent acyl radical of an aliphatic, unsaturated aliphatic, cycloaliphatic, or aromatic tricarboxylic acid;

when m is 4, $R_2$ is a tetravalent acyl radical of a saturated or unsaturated aliphatic or aromatic tetracarboxylic acid;

p is 1, 2 or 3.

Another example of a suitable HALS for purposes of the present invention has the formula:

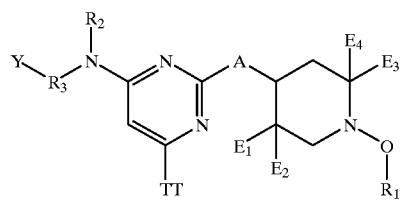

wherein $E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene, $R_1$ is alkyl of 1 to 18 carbon atoms, cycloalkyl of 5 to 12 carbon atoms, a bicyclic or tricyclic hydrocarbon radical of 7 to 12 carbon atoms, phenylalkyl of 7 to 12 carbon atoms, phenylalkyl of 7 to 15 carbon atoms, aryl of 6 to 10 carbon atoms or said aryl substituted by one to three alkyl of 1 to 8 carbon atoms, $R_2$ is hydrogen or a linear or branched chain alkyl of 1 to 12 carbon atoms, $R_3$ is alkylene of 1 to 8 carbon atoms, or $R_3$ is —CO—, —CO—$R_4$—, —CONR$_2$—, or —CO—NR—$R_4$, $R_4$ is alkylene of 1 to 8 carbon atoms, T is phenoxy, phenoxy substituted by one or two alkyl groups of 1 to 4 carbon atoms, alkoxy of 1 to 8 carbon atoms or —N(R$_2$)$_2$ with the stipulation that $R_2$ is not hydrogen, or T is

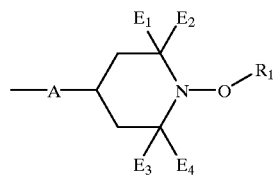

X is —NH$_2$, —NCO, —OH, —O-glycidyl, or —NHNH$_2$, and

Y is —OH, —NH$_2$, —NHR$_2$ where $R_2$ is not hydrogen; or Y is —NCO, —COOH, oxiranyl, —O-glycidyl, or —Si(OR$_2$)$_3$; or the combination $R_3$— Y— is —CH$_2$OR$_2$.

In a preferred embodiment $E_1$ to $E_4$ are each methyl;

$R_1$ is cyclohexyl, octyl, methyl, or heptyl;

$R_2$ is hydrogen, butyl, or dodecyl;

$R_3$ is ethylene when Y is —OH or $R_3$ is pentamethylene when Y is —COOH;

$R_4$ is ethylene or hexamethylene; and

A is —N(R$_7$)— wherein $R_7$ is butyl.

The oligomeric and polymeic components according to the invention can be prepared in a variety of ways. The oligomer has a molecular weight of between 148 and 2000, the preferred molecular weight for the oligomers is between 900 and 1092; polymers have a molecular weight of between 2,000 and 20,000, the preferred molecular weight for the polymers is between 4000 and 6000. Mixtures of said oligomers and polymers may be used. Molecular weight can be determined by the GPC method using a polystyrene standard. These weights are prior to reaction of the components with the UVA or HALS. The oligomeric or polymeric component may include the carbamate functionality or the carbamate functionality may be reacted on to the UVA or HALS component. The carbamate content of the polymer, on a molecular weight per equivalent of carbamate functionality, will generally be between 200 and 1200, and preferably between 300 and 800.

One method of preparation of oligomeric compounds having carbamate functionality is to react an alcohol ('alcohol' is defined herein as having one or more OH groups) with more than one urea to form a compound with carbamate groups. This reaction is accomplished by heating a mixture of the alcohol and ureas. This reaction is also performed under heat, preferably in the presence of a catalyst as is known in the art. Another technique is the reaction of an alcohol with cyanic acid to form a compound with primary carbamate groups (i.e., unsubstituted carbamates). Carbamates may also be prepared by reaction of an alcohol with phosgene and then ammonia to form a compound having primary carbamate groups, or by reaction of an alcohol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful in the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Where, the polymeric component is a carbamate functional acrylic polymer, the polymer is represented by the randomly repeating units according to the following formula:

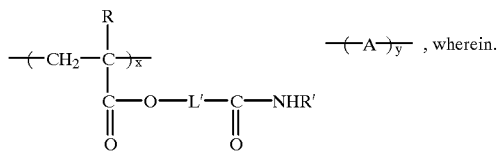

In the above formula, R represents H or CH$_3$. R' represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to photo-induced hydrolysis, and should be avoided in locations that would place the ether linkage in the crosslink matrix. The values x and y represent weight percentages, with x being 10 to 90% and preferably 20 to 50%, and y being 90 to 10% and preferably 80 to 50%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated M-tetramethyl xylene isocyanate (sold by American Cyanamid as TMI®), vinyl toluene, styrene, styrenic derivatives such as α-methyl styrene, t-butyl styrene, and the like.

L represents a divalent linking group, preferably an aliphatic group of 1 to 8 carbon atoms, cycloaliphatic, or aromatic linking group of 6 to 10 carbon atoms. Examples of L include

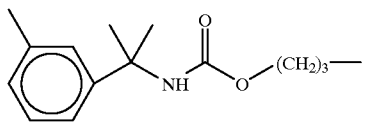

—(CH$_2$)—, —(CH$_2$)$_2$—, —(CH$_2$)$_4$—, and the like. In one preferred embodiment, -L- is represented by —COO-L'— where L' is a divalent linking group. Thus, in a preferred embodiment of the invention, the polymer component (a) is represented by randomly repeating units according to the following formula:

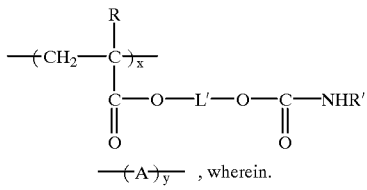

In this formula, R, R', A, x, and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. This carbamate functional acrylic polymer is described in U.S. Pat. No. 5,474,811 which is hereby incorporated by reference. The carbamate functional polymer component used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting ammonia, or a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing a carbamate functional acrylic polymer for use in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing such acrylic polymers involves thermally decomposing urea (to give off ammonia and HNCO) in the presence of a hydroxy-functional acrylic polymer or co-polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to trans-esterify an acrylate polymer with a hydroxyalkyl carbamate.

A cured coating composition according to the present invention includes a durability enhancing agents comprising a monomeric, oligomeric, or polymeric component having bonded thereto at least one HALS and/or UVA, said durability enhancing agent having appended thereto more than one carbamate functional group, or group convertible to a carbamate functional group. The durability enhancing agent may also include other reactive functionality that may be crosslinked into the film. Examples of such functionality includes acid, epoxy, hydroxy, ester and ether functionality. The HALS or UVA may be reacted via a grafting reaction or copolymerized in an addition reaction.

In a preferred embodiment, the durability enhancing agent comprises the reaction product of an acrylic polymer or acrylic oligomer that is carbamate functional or has functionality convertible to carbamate functionality, UVA or HALS including that can act as grafting sites for UVA or HALS compounds. An example of this is reaction of 2-carbamate ethyl methacrylate with either a (Norblock) and/or TMI, followed by reaction with a hydroxyl functional UVA or HALS. Other monomers may be also included in the reaction. Other carbamates such as those listed in U.S. Pat. Nos. 5,356,669 and 5,474,811 may also be used.

The durability enhancing agent may comprise the principal resin of the coating composition, or may be added as a separate component to a coating composition.

A coating composition according to the present invention is cured by self crosslinking, or by reaction of the principal resin with a crosslinking agent having a plurality of functional groups that are reactive with the crosslinkable groups on the principal resin. Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups.

Examples of crosslinking agents include melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), Aminoplast resin such as melamine formaldehyde resin or urea formaldehyde resin are especially preferred.

The preferred aminoplast resins for this purpose include monomeric or polymeric melamine formaldehyde resins, alkoxylated melamine formaldehyde resins and mixtures of alkoxylated melamine formaldehyde resins. The isocyanate crosslinkers suitable for purposes of the present invention include TDI, MDI, isophorone diisocyanate, hexamethylene diisocyanate, and isocyanurate trimers of these, which may be blocked for example with alcohols or oximes selected from the group consisting of triazines benzotriazoles, 2-hydroxybenzophenone compounds, oxanilides, and mixtures thereof.

Where an aminoplast crosslinking agent is used, and the aminoplast is reacted with carbamate functionality, or functionality convertible to a carbamate, excess aminoplast groups are left to crosslink with the reactive functionality on the principal resin.

While the oligomer-bound or polymer-bound HALS may be used in any layer of a multi-layer coating composition, it is preferably used in a clearcoat composition. The clearcoat may be used alone or with a pigmented basecoat composition.

The pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C.

The invention is further illustrated by the following non-limiting examples.

EXAMPLES

Example 1

Acrylic Polymer-Bound Benzotriazole

Polymer-bound Ultraviolet Light Absorber

A polymer-bound ultraviolet light absorber containing 2.0% benzotriazole, based on total coating solids, was prepared by polymerizing 28. 4 grams of a benzotiazole, sold under the trademark Norbloc™ 7966, available from Noramco, Inc. onto 1514.3 grams of a hydroxy functional carbamate resin, sold under the trademark Ureclear®, commercially available from BASF Corporation. The hydroxy functional carbamate resin had a hydroxy equivalency of 1650 g/equivalent at 95% non-volatile content.

Example 2

Coating Composition (Control)

A control coating composition was prepared having the following formulation:

| Ingredient | Amount |
|---|---|
| Carbamate functional acrylic resin[1] | 75.51 |
| Resimine 747 Aminoplast | 20.66 |
| Acid Catalyst | 1.00 |
| Fumed Silica Rheology Control Additive | 1.31 |
| Flow Control Additive | 0.20 |
| Adhesion promoter | 1.32 |
| Total | 100.00 |

[1]Carbamate functional acrylic available from BASF Corp. under the trademark Ureclear ®, as described in U.S. Pat. 5,356, 669.

Example 3

Coating Composition Containing Various Additions of UVAs and HALS

To the coating composition in Example 2 were added the following HALS and UVAs. Amounts are in percent by weight based on total coating composition solids content. The additions of the HALS and UVAs are set forth below.

| Ingredient | Ex. A* | Ex. B | Ex. C |
|---|---|---|---|
| Polymeric benzotriazole from Ex. 1 | — | 2% | 1.5% |
| 2-hydroxyphenyl triazine free add** | — | — | 2.0% |
| 3058 | 1.0 | — | 1.0 |
| 1164 | 1.5 | — | 1.5% |

*Ex. A is the control coating composition.
**Free add means that the triazine is not polymer or oligomer bound.

TABLE 1

| Comparative Data for Environmental etch Results of Coating Compositions | |
|---|---|
| Example | Environmental etch Rating |
| Ex. A | 5–6 |
| Ex. B | 3–4 |
| Ex. C | 4–5 |

We claim:

1. A method for coating a substrate, comprising the steps of
   (1) applying to a substrate a curable coating composition comprising a durability enhancing agent comprising
   a) oligomers or polymers having grafted thereon at least one polymeric or oligomeric hindered amine light stabilizer (HALS), said oligomers or polymers comprising more than one functional group selected from the group consisting of primary carbmate groups and groups convertible to primary carbamate groups for undergoing a crosslinking reaction, and
   b) a crosslinking agent having more than one functional group which reacts with the carbamate functionality on component (a)
   wherein the ultraviolet light absorbing compounds and hindered amine light stabilizers reacted onto component a) are selected from the group consisting of ultraviolet light absorbers comprising polymer-bound benzotriazoles having the formula

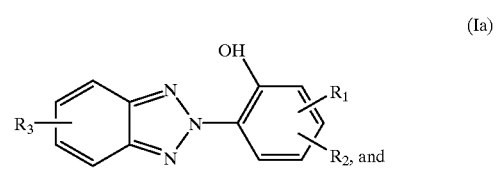

(Ia)

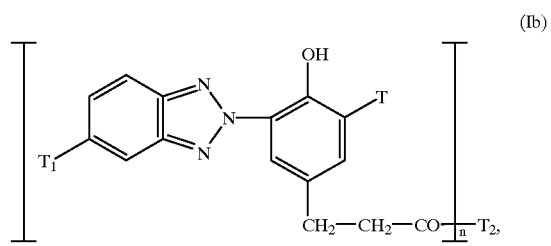

(Ib)

polymer-bound 2-hydroxyphenyl triazines having the formula (IIa)

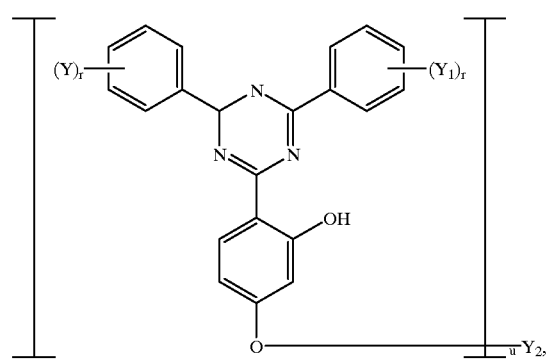

and mixtures thereof,
wherein in the compounds of the formula (Ia),
$R_1$ is hydrogen, alkyl having 1 to 24 carbon atoms, phenylalkyl having 1 to 4 carbon atoms in the alkyl moiety,
$R_2$ is H, halogen, or alkyl having 1 to 18 carbon atoms, phenyl alkyl having 1 to 4 carbon atoms in the alkyl moiety
$R_3$ is H, chlorine, alkyl or alkoxy, having in each case 1 to 4 carbon atoms,
in formula (Ib) T is hydrogen or alkyl having 1 to 6 carbon atoms,
$T_1$ is hydrogen, chlorine or alkyl having 1 to 4 carbon atoms, and n is 1 or 2,
when n is 1, $T_2$ is chlorine or a radical of the formula -$OT_3$, where T3 is hydrogen, alkyl which has 1 to 18 carbon atoms and is unsubstituted or substituted by 1 to 3 hydroxyl groups; alkyl which has 3 to 18 carbon atoms interrupted once or several times by —O— and is unsubstituted or substituted by hydroxyl; alkenyl which has 2 to 18 carbon atoms and is unsubstituted or substituted by hydroxyl; phenylalkyl having 1 to 4 carbon atoms in the alkyl moiety, or a radical of the formula —CH2CH(OH)-T7 or glycidyl; where $T_7$ is hydrogen, alkyl having 1 to 18 carbon atoms, phenyl which is unsubstituted or substituted by hydroxyl; and if n is 2, $T_2$ is a radical of the formula —O-$T_9$—O—, $T_9$ is alkylene having 2 to 8 carbon atoms, alkenylene having 4 to 8 carbon atoms, cyclohexylene, alkylene which has 2 to 18 carbon atoms and is interrupted once or several times by —O—, in the formula (IIa)

u is 1 to 2, r is an integer from 1 to 3, the substituents $Y_1$ independently of one another are hydrogen, hydroxyl, halogen, halogenomethyl, alkyl having 1 to 12 carbon atoms, alkoxy having 1 to 18 carbon atoms, when u is 1, $Y_2$ is alkyl having 1 to 18 carbon atoms, alkyl which has 1 to 12 carbon atoms and is substituted by —COOH —COO$Y_8$, —CONH$_2$, CONH$Y_9$, —ON$Y_9Y_{10}$, —CN, —OCO$Y_{11}$, or mixtures thereof; alkyl which has 4 to 20 carbon atoms which is interrupted by one or more oxygen atoms and is unsubstituted or substituted by hydroxyl or alkoxy having 1 to 12 carbon atoms; alkenyl having 3 to 6 carbon atoms, glycidyl, phenylalkyl which has 1 to 5 carbon atoms in the alkyl moiety and is unsubstituted or substituted by hydroxyl, chlorine and or methyl; —CO$Y_{12}$ or SO$_2$ $Y_{13}$, wherein $Y_8$ is alkyl having 1 to 18 carbon atoms, alkenyl having 3 to 18 carbon atoms, alkyl which has 3 to 20 carbon atoms, and is interrupted by one or more oxygen atoms, or said alkyl substituted by substituted by hydroxyl; alkenyl having 3 to 18 carbon atoms, glycidyl or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical; and when u is 2, Y2 is alkylene having 2 to 16 carbon atoms, alkylene having 4 to 12 carbon atoms and is interrupted by one or more —O— atoms and/or is substituted by hydroxyl; —CH$_2$CH(OH)CH$_2$—O— $Y_{15}$—OCH$_2$CH(OH)CH$_2$, or —(CH$_2)_mCO_2$—$Y_{18}$—OCO—(CH$_2)_m$, in which m is 1,2 or 3, $Y_{15}$ is alkylene having 2 to 10 carbon atoms, phenylene or a group -phenylene-M-phenylene- in which M is —O—, —S—, —SO$_2$—, —CH$_2$—or —C(CH$_3)_2$—, and $Y_{18}$ is alkylene having 2 to 10 carbon atoms or alkylene which has 4 to 20 carbon atoms and is interrupted once or several times by oxygen and hindered amine light stabilizers, wherein the hindered amine light stabilizer is selected from the group consisting of HALS having the formula

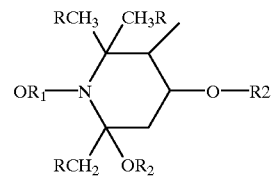

wherein R is hydrogen or methyl, $R_1$ is independently $C_1$–$C_{18}$ alkyl, $C_2$–$C_{18}$ alkenyl, $C_2$–$C_{18}$ alkynyl, $C_5$–$C_{12}$ cycloaklyl, $C_6$–$C_{10}$ bicycloalkyl, $C_5$–$C_8$ cycloalkenyl, C6–C10 aryl, C7–C9 aralkyl, C7–C9 aralkyl substituted by alkyl or aryl, or

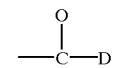

wherein D is C1–C18 alkyl, C1–C18 alkoxy, phenyl, phenyl substituted by hydroxy, alkyl, alkoxy or amino or amino mono- or di-substituted by alkyl or phenyl;

m is 1–4, when m is 1, $R_2$ is hydrogen, $C_1$–$C_{18}$ alkyl optionally interrupted by one or more oxygen atoms, $C_2$–$C_{12}$ alkenyl, $C_6$–$C_{10}$ aryl, $C_7$–$C_{18}$ aralykyl, glycidyl, a monovalent acyl radical of an aliphatic cycloaliphatic, araliphatic or aromatic carboxylic acid or of a carbamaic acid

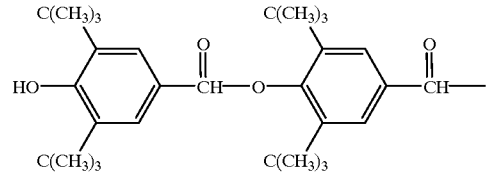

wherein x is 0 or 1, or

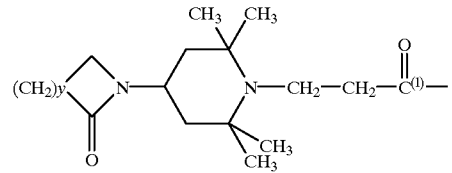

wherein y is 2–4, when m is 2, $R_2$ is $C_1$–$C_{12}$ alkylene, $C_4$–$C_{12}$ alkenylene, xylylene, a divalent acyl radical of an aliphatic, cycloaliphatic, araliphatic or aromatic dicarbxylic acid or of a dicarbamic acid, when m is 3, $R_2$ is a trivalent acyl radical of an aliphatic, unsaturated aliphatic, cycloaliphatic or aromatic tricarboxylic acid;

when m is 4, $R_2$ is a tetravalent acyl radical of a saturated or unsaturated aliphatic or aromatic tetracarboxylic acid P is 1,2 or 3; and a hindered amine light stabilizer having the formula

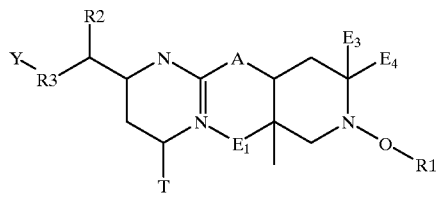

(II)

wherein $E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene, $R_1$ is alkyl of 1 to 18 carbon atoms, cycloalkyl of 5 to 12 carbon atoms, a bicyclic or tricyclic hydrocarbon radical of 7 to 12 carbon atoms, phenylalkyl of 7 to 12 carbon atoms, phenylalkyl of 7 to 15 carbon atoms, aryl of 6 to 10 carbon atoms or said aryl substituted by one to three alkyl of 1 to 8 carbon atoms, $R_2$ is hydrogen or a linear or branched chain alkyl of 1 to 12 carbon atoms, $R_3$ is aklylene of 1 to 8 carbon atoms, or $R_3$ is —CO—, —CO—$R_4$—, —CONR$_2$—, or —CO—NR—$R_4$, $R_4$ is alkylene of 1 to 8 carbon atoms, T is phenoxy, phenoxy substituted by one or two alkyl groups of 1 to 4 carbon atoms, alkoxy of 1 to 8 carbon atoms or -NM($R_2$)$_2$ with the stipulation that $R_2$ is not hydrogen, or T is

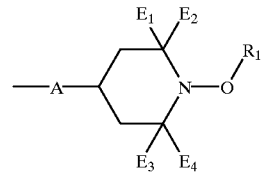

X is —NH$_2$, —NCO,

—OH, —O-glycidyl, or —NHNH2, and Y is OH, —NH$_2$, —NHR$_2$, where $R_2$ is not hydrogen; or Y is —NCO, —COOH, oxiranyl, —O-glycidyl, or —Si(OR$_2$)$_3$; or the combination $R_3$—Y is —CH$_2$OR$_2$, (2) exposing the coated substrate at a temperature and time sufficient to crosslink and cure the coating composition, to obtain a crosslinked film, said film demonstrating gloss retention and etch resistance upon exposure to ultraviolet radiation.

2. The method of claim 1 wherein component (a) comprises a compound selected-from the group consisting of oligomers having appended thereto more than one functional group selected from the group consisting of carbamate groups, and groups that can be converted to carbamate, said oligomers having a molecular weight of between 148 and 2000, polymers having appended thereto more than one functional group selected from the group consisting of carbamate groups, urea groups and functional groups convertible to carbamate or urea groups, said polymers having a molecular weight of greater than 2000, and mixtures of said polymers and oligomers.

3. A coated article obtained by the method of claim 1.

4. The method of claim 1 wherein component a) is a carbamate functional polymer selected from the group consisting of polyester, epoxy, alkyd, urethane, acrylic, polyamide and polysilane polymers and mixtures thereof.

* * * * *